United States Patent
Poynter

(10) Patent No.: US 9,725,243 B2
(45) Date of Patent: Aug. 8, 2017

(54) CONTAINER SKATE

(71) Applicant: James R. Poynter, Bellevue, KY (US)

(72) Inventor: James R. Poynter, Bellevue, KY (US)

( * ) Notice: Subject to any disclaimer, the term of this patent is extended or adjusted under 35 U.S.C. 154(b) by 0 days.

(21) Appl. No.: 14/180,678

(22) Filed: Feb. 14, 2014

(65) Prior Publication Data

US 2014/0255142 A1 Sep. 11, 2014

Related U.S. Application Data

(60) Provisional application No. 61/774,666, filed on Mar. 8, 2013.

(51) Int. Cl.
| | |
|---|---|
| *B65G 7/02* | (2006.01) |
| *A47B 91/06* | (2006.01) |
| *B32B 3/02* | (2006.01) |
| *A47G 27/02* | (2006.01) |
| *B65D 90/16* | (2006.01) |

(52) U.S. Cl.
CPC ............... *B65G 7/02* (2013.01); *A47B 91/06* (2013.01); *A47G 27/0206* (2013.01); *B32B 3/02* (2013.01); *B65D 90/16* (2013.01); *Y10T 16/209* (2015.01)

(58) Field of Classification Search
CPC .. B65D 90/16; B32B 3/02; B65G 7/02; Y10T 16/209; A47B 91/06; A47G 27/0206; B60P 7/13; B60P 7/132
See application file for complete search history.

(56) References Cited

U.S. PATENT DOCUMENTS

| | | | | | |
|---|---|---|---|---|---|
| 1,853,007 | A | * | 4/1932 | Stannard | 280/32.6 |
| 3,720,978 | A | * | 3/1973 | Miller, Jr. | A47B 91/00 16/42 R |
| 4,049,149 | A | * | 9/1977 | Durenec | B60P 7/132 220/23.4 |
| 4,537,540 | A | * | 8/1985 | Boughton | B60P 1/6418 108/55.1 |
| 4,671,393 | A | * | 6/1987 | Rainey | 190/1 |
| 4,741,449 | A | * | 5/1988 | Bersani | B65D 90/0013 220/1.5 |
| 4,940,620 | A | * | 7/1990 | Silk et al. | 428/81 |
| 5,236,387 | A | * | 8/1993 | Simon | 452/194 |
| 5,443,885 | A | * | 8/1995 | Wilson | 428/121 |
| 5,506,040 | A | * | 4/1996 | Cordani | 428/218 |

(Continued)

OTHER PUBLICATIONS (Author unknown), "ISO Container Corner Fittings, Steel, Stainless Steel and Aluminum", www.tandemloc.com/toc-corner-fittings.asp, (2014) 2 pgs.

(Continued)

*Primary Examiner* — J. Allen Shriver, II
*Assistant Examiner* — Hilary L Johns
(74) *Attorney, Agent, or Firm* — Wood Herron & Evans LLP

(57) ABSTRACT

A container skate of synthetic material facilitates movement of a container. A sliding body has two inclined ends facilitating sliding of the body in opposite directions with a container thereon without further damage to the container or support surface over which it is moved. The body has an upstanding plug extendable into a container corner fitting so pulling of the container draws the body with it, sliding over a surface while bearing container weight. The body further includes a stop member extending therefrom and spaced from said plug.

14 Claims, 3 Drawing Sheets

(56) References Cited

U.S. PATENT DOCUMENTS

| | | | | |
|---|---|---|---|---|
| 5,513,900 | A * | 5/1996 | Iglesias | 297/463.1 |
| 5,557,824 | A * | 9/1996 | Bushey | A47B 91/06 |
| | | | | 16/42 R |
| 5,573,213 | A * | 11/1996 | Henderson | A47B 91/06 |
| | | | | 135/67 |
| 5,720,057 | A * | 2/1998 | Duncan | 5/420 |
| 6,280,817 | B1 * | 8/2001 | McCrossin | A47G 27/0206 |
| | | | | 16/42 R |
| 6,390,742 | B1 * | 5/2002 | Breeden | B60P 7/132 |
| | | | | 410/71 |
| 7,231,690 | B2 * | 6/2007 | Bushey | A47B 91/06 |
| | | | | 16/37 |
| 7,406,746 | B2 * | 8/2008 | Bushey | 16/42 R |
| 7,867,599 | B1 * | 1/2011 | Willingham | 428/119 |
| 8,635,742 | B2 * | 1/2014 | Smith | B65G 7/02 |
| | | | | 16/18 R |
| 2010/0187399 | A1 * | 7/2010 | Chase | A47B 91/06 |
| | | | | 248/688 |

OTHER PUBLICATIONS (Author unknown), "Tandemloc's Aperture Plate—Tandemloc—Lifting Products", www.tandemloc.com/securing-aperture-plate-T10021A-100.asp, (2014) 3 pgs.

(Author unknown), "Intermodal Container", http://en.wikipedia.org/wiki/Intermodal_container, (2014) 10 pgs.

\* cited by examiner

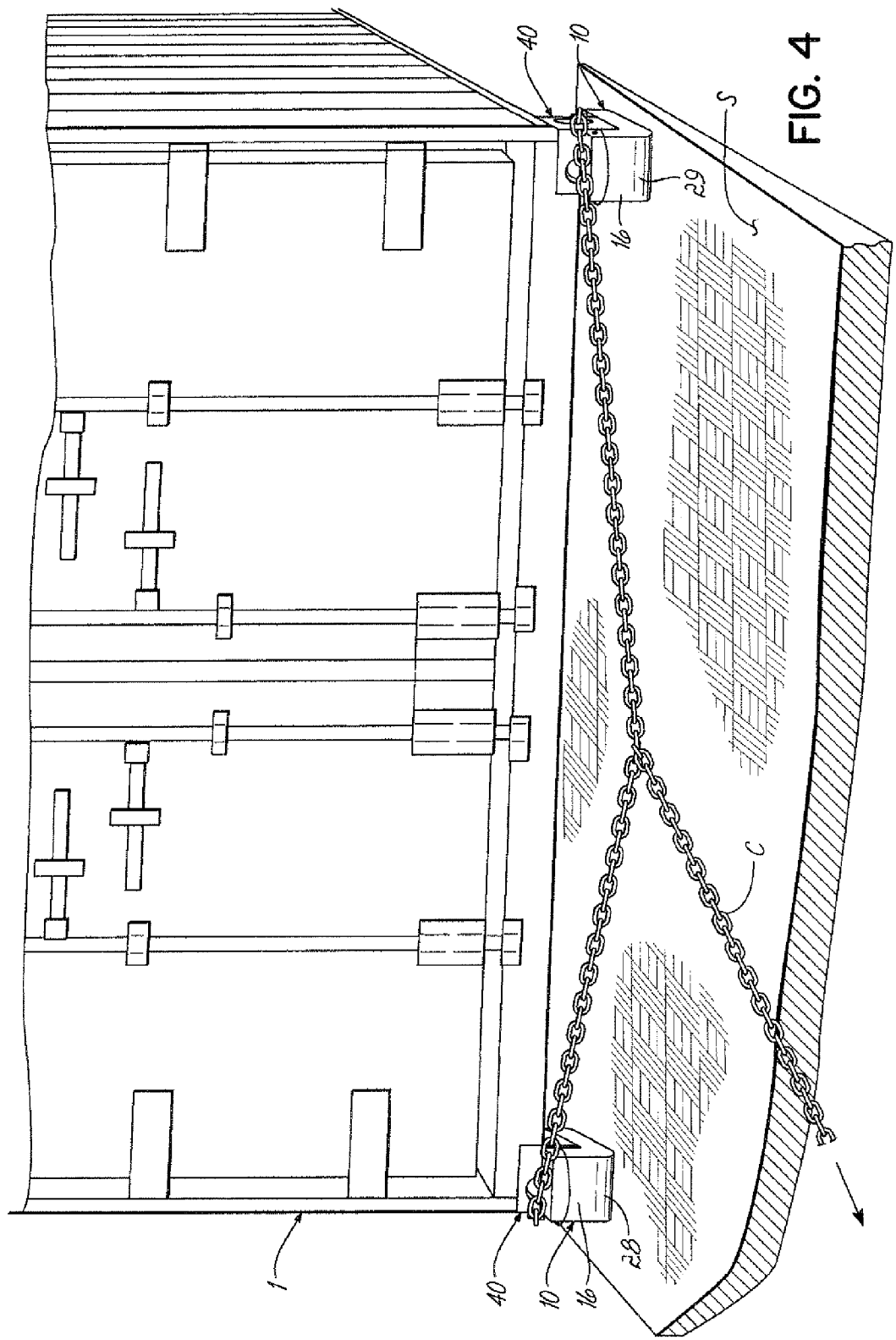

CONTAINER SKATE

FIELD OF THE INVENTION

This invention relates to shipping and storage containers and more particularly to apparatus for supporting and moving such containers across surfaces.

BACKGROUND OF THE INVENTION

Shipping and storage containers are well-known. Traditionally reusable and of steel manufacture, such containers meet ISO Standard 1161 and are American Bureau of Shipping (ABS) certified. They are typically used in intermodal shipping and are carried on ships, rail cars, trailers and the like. Containers vary significantly in size, shape and carrying capacity. By way of example only, such containers may range from about 20 to about 53 feet long, are typically about 8 feet wide and, for example, vary from about 8 feet to 10 feet, 6 inches tall. Such containers, when filled, typically weigh several tons, for example, depending on load.

Such containers are typically rectangular in shape and include, at each of their eight corners, a welded-on corner fitting as an integral member. Such corner fittings are in the form of block-like structures, relatively hollow, with apertures in the walls leading to the hollow cores.

A variety of fittings, lift hooks and other lift fittings, tie-down fittings and the like connect to the corner fittings through these apertures for lifting and securing the containers together or onto support surfaces on ship decks, rail cars, trailers and the like.

One source of weld-on corner fittings is Tandemloc, Inc. of Havelock, N.C.

Such containers are generally handled in large material handling and storage facilities, facilitated by cranes, forklifts, gantries and other capital intensive equipment. However, such containers may also be found and used in smaller facilities, where such expensive moving apparatus is not readily available.

In these other facilities, such containers may simply be pushed or slid over supporting surfaces such as wood decks, steel or aluminum decks or other surfaces such as concrete, asphalt, dirt or the like. Pushing, pulling or sliding such containers is difficult and can scrape, scar and damage these surfaces.

Accordingly, it is objective of the invention to provide apparatus to facilitate sliding of such containers over or across a surface.

A further objective has been to eliminate damage to a surface over which a container is slid.

A further objective has been to provide apparatus for moving a container over a surface without damage to the surface and without requiring cranes, gantries, forklifts or other capital intensive devices to lift the containers.

SUMMARY OF THE INVENTION

To these ends, a preferred embodiment of the invention comprises a monolithic one-piece container skate of synthetic material having a lower sliding surface, preferably radiused ends extending from the lower sliding surface, and a projection on an upper surface thereof, configured to extend into an aperture of a corner fitting of a container to retain the skate on a container when the container is pushed or pulled across a surface. The skate preferably includes an upwardly extending stop member for engaging the lower front edge of a container supported on the skate to further resist any movement of the container being slid as would overrun the skate.

The main skate body of the invention is constructed of synthetic material, preferably recycled plastic, such as polypropylene, and the skate body comprises a unitary, plastic block, in one embodiment, six inches wide, six inches high and twelve inches long. The block composition is of any suitable material providing a low, nearly constant co-efficient of friction as the block, bearing container weight, slides over a support surface.

The lower front and rear ends of said body are inclined, or preferably curved, to form a sled runner effect on the front and rear lower sections thus enabling it to be used in both directions. This radius on both lower ends allows the operator to slide and load and unload the container without additional ramps or boards on most of the surfaces encountered in use today and without having to reverse the body's position, as container movement is reversed between load and unload (push-pull) motions.

The skate is of sufficient height to minimize container parts from dragging or inadvertently being damaged (secondary damage) as the container is moved.

The top mid section of the body has an upstanding plug configured to extend into an aperture of a corner fitting of a container to secure the skate to the container at the corner fitting and prevent it from becoming disengaged from the container during use. An upstanding stop abutment sticking up from the skate also prevents the container from sliding over and off the skate when the container is pulled.

Inclined or radiused ends of the skate can be made more or less pronounced or can be in a straight line taper. A hole or multiple holes through the skate body crosswise and/or lengthwise or a screw eye type attachment can be provided to be used as a handle for manipulating the unloaded skate prior to container placement.

In use, this invention is placed between the lower surface of the container corner fittings and the surface of the area where the container is resting. The container is placed on the skate, at least its forward end on two respective skates under each forward container corner, eliminating the possibility of further damage to the container or the surface over which it will be slid and reducing the possibility of becoming an ignition source. Sliding resistance is reduced and damage to the upper support surface is minimized or eliminated.

A winch, in conjunction with a wire, rope, cable or chain assembly is attached to the container for pulling it and the supporting skate across a surface.

These and other objectives and advantages will become readily apparent from the following detailed description and from the drawings in which:

BRIEF DESCRIPTION OF THE DRAWINGS

FIG. 4 is a view illustrating a skate-supported container sliding onto a steel deck surface.

DETAILED DESCRIPTION OF THE INVENTION

Figure 1:
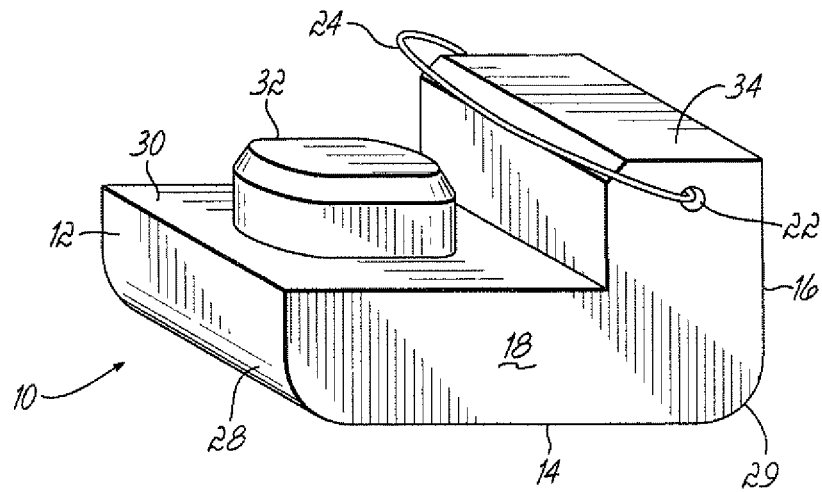
FIG. 1 is a perspective view of a container skate according to one embodiment of the invention.

Turning now to the FIGS., a preferred embodiment as in FIG. 1 includes a monolithic main skate body 10 of preferably synthetic material such as recycled plastic having a preferably relatively low co-efficient of friction (as compared to wood, for example) to facilitate sliding over a support surface such as wood, asphalt, concrete, aluminum, steel, other plastic or the like as may be found, for example, on a roadway, trailer, transport vehicle, storage facility or the like. Preferably recycled polypropylene is used.

Other materials could be used, such as virgin plastic, wood, compressed wood, and/or mixtures of various materials though without certain of the advantages noted herein. However, the preferred material will not absorb oils and is not subject to splintering and deterioration as is wood.

The material of body 10 is selected such that the block has a crush resistance sufficient to withstand the container weight applied to it when supporting the container.

Body 10 has a lower surface 14, two ends 12 and 16 and two sides 18, 20 (not shown). Preferably the body 10 may be about 12 inches long and about 6 inches wide and 6 inches tall. Other sizes can be used.

A through-hole 22 accommodates a handle 24 such as a flexible wire attached to body 10 for handling, carrying or moving body 10 manually. Wire 24 is not intended for pulling body 10 when it bears weight of a container.

Ends 12, 16 of block 10 are inclined, meaning tapered, radiused or rounded, respectively at 28, 29 from the ends 12, 16 respectively, to bottom or lower surface 14 providing a sled-like or runner configuration to facilitate sliding of surface 14 across or along a support surface in either of opposite directions. Due to both inclined ends, the body 10 is multidirectional in function and a container on which it rests can be moved or slid in opposite directions.

Body 10 has an upper surface or face 30, as shown, with a plug 32 extending upwardly therefrom. A camfer is formed around the top edge of plug 32 to assist in engagement with the corner fitting 40. Plug 32 is configured to extend into an aperture 33 of a corner fitting 40 (FIG. 2) welded into a container at its corners. Fitting 40 is preferably hollow or provided with through passages for a pulling chain, for example (FIGS. 3, 4), or aperture 33 for plug 32 as noted. Body 10 also includes an upstanding stop member 34 extending upwardly from body 10 from the level of surface or face 30. Stop member 34 is provided with a camfered edge to assist with the alignment and engagement of the corner fitting on body 10. Preferably plug 32 is shorter than stop 34 to allow ample room for a chain to be drawn through the horizontal opening in the corner fitting for pulling.

Figure 2:
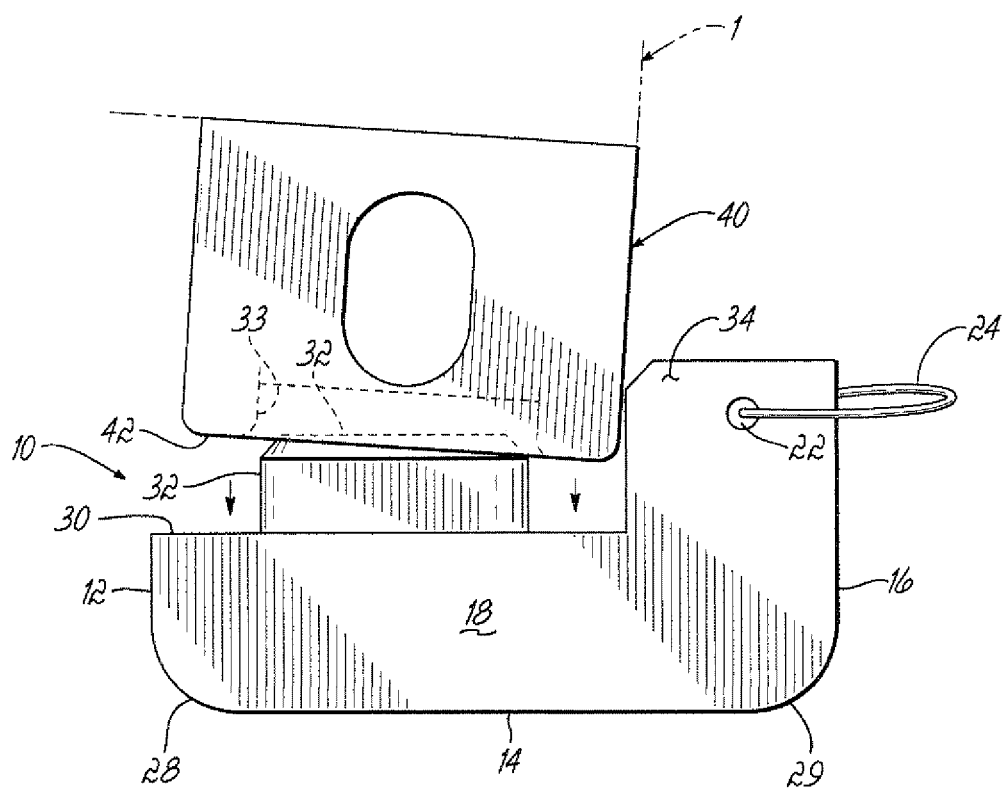
FIG. 2 is an elevational view of the skate of FIG. 1 illustrating its relationship to a corner fitting of the type which will be welded to a container corner (the container not shown for clarity)
Figure 3:
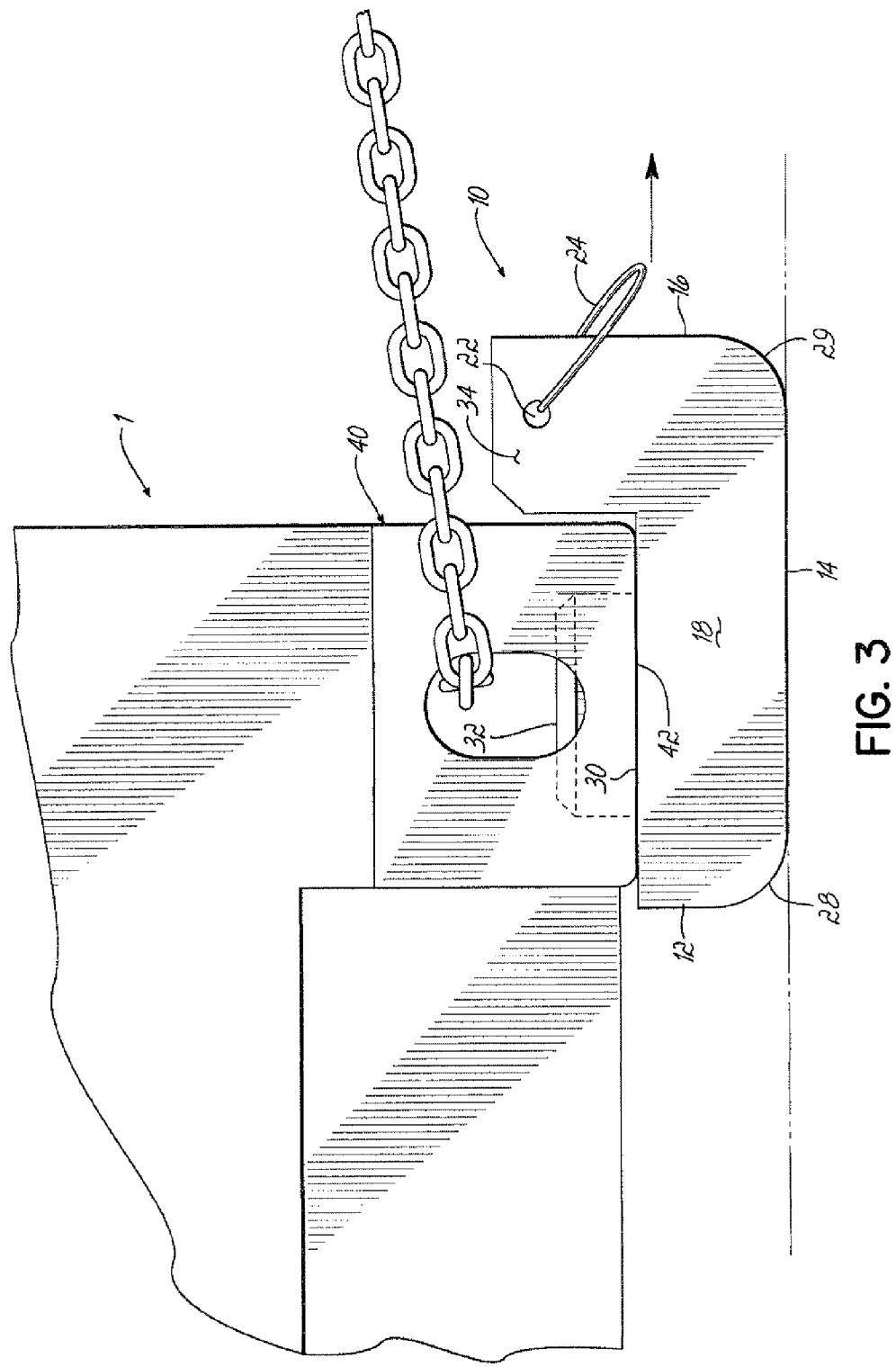
FIG. 3 is an elevational view illustrating a skate in place supporting a container as described herein.

The flat configuration of the upper face 30 of body 10 is suitable to receive the lower surface 42 of a corner fitting of a container as illustrated in FIG. 2. When a container 1 is supported on body 10, the plug 32 and stop 34 cause body 10 to slide when the container is pulled or pushed; it cannot slide off the body 10.

In use, a container is lifted, jacked up or dropped onto body 10 with plug 32 extending into the corner fitting 40. Preferably a body 10 is secured under each lower corner of a container.

Thereafter, the container is winched or pulled across supporting surfaces, such as a roadway, trailer bed, boat deck, as illustrated in FIG. 4. As the container is pulled by chain connected to corner fittings 40, for example, body 10, facilitated by its composition, by inclined ends 28 or 29 (whichever leads) and surface 14, slides along, pulled by the engagement of a container corner fitting 40 on plug 32 or one or more surfaces of the body 10, as provided by member 34.

The height of body 10 provides sufficient clearance between the container and support surface to assure ease of sliding without further damage. The inclined areas 28, 29 are provided to enable the container to be moved to and across the surface by providing a slight lifting action when encountering a minor obstruction or artifact on the surface.

What is claimed is:

1. A skate for supporting a shipping container, for holding items for shipping in intermodal shipping uses, said shipping container having four walls, a floor, four bottom corners and an integral corner fitting at each bottom corner, each said corner fitting having an opening, when said shipping container is pulled over a supporting surface, said skate comprising:
    a sliding body;
    an upper face on said body;
    a plug extending upwardly from said face and having an upper end;
    said plug for operably engaging one of said container corner fittings through an opening in said one container corner fitting, and
    an upwardly extending container stop member extending upwardly from said face and laterally spaced from said plug;
    said sliding body for receiving a portion of a container corner fitting between said plug and said stop member.

2. A skate as in claim 1 wherein said upper face comprises at least a flat surface oriented around said plug.

3. A skate as in claim 2 wherein in use said stop member extends upwardly above said flat surface.

4. A skate as in claim 3 wherein said plug is for insertion into said one container corner fitting without interference by the stop member, and said stop member extending above an upper end of said plug.

5. A skate as in claim 1 having a flexible handle attached to said body for manual manipulation thereof.

6. A skate as in claim 1 wherein said container stop member on said body is laterally spaced from said plug, said plug being insertable into said one container corner fitting without interference by the stop member, and said stop member extending above an upper end of said plug.

7. A method of moving a shipping container of the type for holding items for shipping in intermodal shipping uses, said shipping container having four walls, a floor, four bottom corners and an integral corner fitting at each bottom corner, each said corner fitting having an opening, when said shipping container is pulled over a supporting surface, said method including the steps of:
    lowering a portion of said shipping container onto a sliding body;
    engaging a corner fitting of said container with a plug extending upwardly from said sliding body with said plug extending into said corner fitting;
    pulling said container; and
    sliding said body with said container thereon over a supporting surface while bearing weight of said container on said body.

8. A method as in claim 7 wherein said sliding step includes pulling said container toward a stop extending upwardly from said sliding body, said stop laterally spaced from said plug, with a portion of said corner fitting disposed between said plug and said stop.

9. In combination, a shipping container of the type for holding items for shipping in intermodal shipping uses, said shipping container having four walls, a floor, four bottom corners and an integral corner fitting at each bottom corner, each said corner fitting having an opening, when said shipping container is pulled over a supporting surface, and a supporting skate therefor, said container having side walls and openings disposed at lower corners of said container;
  said skate having a sliding body;
  an upper surface on said sliding body,
  a container-engaging plug extending upwardly from said upper surface of the body;
  a shipping container stop spaced laterally from said plug and extending upwardly above and from said surface,
  said plug extending into one of said apertures of said container; and
  said shipping container stop extending upwardly adjacent an outer portion of said container.

10. The combination of claim 9 wherein a lower portion of said container is disposed between said plug and said container stop.

11. The combination of claim 10 wherein said openings are disposed in corner fittings at lower corners of said container.

12. The combination of claim 11 wherein said plug has an upper end, said stop extending vertically above an upper end of said plug, said container engaging plug extending upwardly to said upper end from said body upper surface;
  said stop being wider than said plug; and
  said plug and said stop defining a space therebetween for receiving a lower corner fitting of said container therebetween.

13. A method of transporting over a surface a shipping container of the type for holding items for shipping in intermodal shipping uses, said shipping container having four walls, a floor, four bottom corners and an integral corner fitting at each bottom corner, each said corner fitting having an opening, when said shipping container is pulled over a supporting surface, the method including the steps of:
  lowering the shipping container onto slidable container skates,
  with said openings being lowered over plugs extending upwardly from said respective skates and said corners surrounding said plugs,
  disposing portions of said container at said lower corners between said plugs and stop abutments extending upwardly from said skates, with said stop abutments extending upwardly and exteriorly of said portions; and
  sliding said container and said skates over said surface.

14. A skate for use in transporting a shipping container over a surface wherein said shipping container is of the type having lower corners comprising integral corner fittings and said skate comprising:
  a sliding body having an upper surface;
  a plug extending upwardly from said upper surface and having an upper end;
  a container stop member laterally spaced from said plug and extending upwardly from said upper surface of said body above said upper end of said plug;
  said stop and said plug defining a space therebetween for operably receiving a portion of said corner fitting with said plug operably extendable into a corner fitting and said stop extending upwardly exteriorly of said corner fitting.

* * * * *